(12) United States Patent
Ashida

(10) Patent No.: US 9,309,141 B2
(45) Date of Patent: Apr. 12, 2016

(54) METHOD OF MANUFACTURING OPTICAL ELEMENT AND OPTICAL ELEMENT

(75) Inventor: Shuhei Ashida, Hachioji (JP)

(73) Assignee: Konica Minolta Advanced Layers, Inc., Tokyo (JP)

( * ) Notice: Subject to any disclaimer, the term of this patent is extended or adjusted under 35 U.S.C. 154(b) by 329 days.

(21) Appl. No.: 13/824,962

(22) PCT Filed: Sep. 16, 2011

(86) PCT No.: PCT/JP2011/071239
§ 371 (c)(1),
(2), (4) Date: Jun. 19, 2013

(87) PCT Pub. No.: WO2012/036277
PCT Pub. Date: Mar. 22, 2012

(65) Prior Publication Data
US 2014/0147633 A1     May 29, 2014

(30) Foreign Application Priority Data
Sep. 16, 2010    (JP) .................................. 2010-208320

(51) Int. Cl.
*C03B 11/08*     (2006.01)
*G02B 3/00*     (2006.01)

(52) U.S. Cl.
CPC ............... *C03B 11/082* (2013.01); *G02B 3/00* (2013.01); *C03B 2215/414* (2013.01); *C03B 2215/61* (2013.01); *Y10T 428/24479* (2015.01)

(58) Field of Classification Search
CPC ............ C03B 11/082; C03B 2215/414; C03B 2215/61
See application file for complete search history.

(56) References Cited

U.S. PATENT DOCUMENTS 6,270,699 B1 * 8/2001 Fujita ............................. 264/2.7
2011/0016920 A1   1/2011 Hayamizu et al.

FOREIGN PATENT DOCUMENTS

| CN | 101712526 | 5/2010 |
|----|-----------|--------|
| JP | 1-308840 | 12/1989 |
| JP | 2006-256906 | 9/2006 |
| WO | WO 2009/091027 | 7/2009 |

(Continued)

OTHER PUBLICATIONS

JP 2006-256906 Machine translation, Forming Die and Method of Manufacturing Optical Glass Lens, Shimizu Akihiro et al., Sep. 28, 2006.*

(Continued)

*Primary Examiner* — Queenie Dehghan
(74) *Attorney, Agent, or Firm* — Cozen O'Connor

(57) ABSTRACT

Method of manufacturing an optical element capable of providing a satisfactory shape accuracy even where a plurality of optical elements are molded. By providing a protruding portion 12d to change the flow of molten glass drop GD for an optical element with a forming mold 10, it is possible to make the glass drop GD for an optical element flow along an optical surface transferring surface 12a in the vicinity of edge side close to the drop point of the glass drop GD for an optical element, among the optical surface transferring surfaces 12a. According to this, even where a plurality of glass lenses 100 are collectively molded, it is possible to transfer an optical function surface 101a of the glass lens 100 to each optical surface transferring surface 12a with a high accuracy and to collectively manufacture the glass lenses 100 with a satisfactory shape accuracy.

16 Claims, 8 Drawing Sheets

(56) References Cited

FOREIGN PATENT DOCUMENTS

| | | |
|---|---|---|
| WO | WO 2009/116573 | 9/2009 |
| WO | WO 2009/122949 | 10/2009 |

OTHER PUBLICATIONS

Office Action dated Jan. 20, 2015 which issued in the corresponding Japanese Patent Application No. 2012-534067.

* cited by examiner

METHOD OF MANUFACTURING OPTICAL ELEMENT AND OPTICAL ELEMENT

RELATED APPLICATIONS

This is a U.S. national stage of application No. PCT/JP2011/071239 filed on Sep. 16, 2011.

This patent application claims the priority of Japanese application no. 2010-208320 filed Sep. 16, 2010, the disclosure content of which is hereby incorporated by reference.

TECHNICAL FIELD

The present invention relates to a method of manufacturing a glass optical element and an optical element, particularly to a method of manufacturing an optical element which is the type of directly press-molding molten state glass and an optical element which is molded by using the manufacturing method.

BACKGROUND ART

As a method of molding a glass optical element, for example, there is a method in which an optical element is obtained by dropping a predetermined weight of molten glass, holding the dropped molten glass drop at a lower mold, and pressing the molten glass drop between molds without reheating (refer to Patent Literature 1).

However, in the method as described in Patent Literature 1, when the molten glass drop is dropped in the vicinity of the center of an optical surface transferring surface and a mold having a plurality of optical surface transferring surfaces is used in order to mold a plurality of optical elements, there is a possibility that the optical element with a satisfactory shape accuracy may not be obtained. That is, in a case of the mold having the plurality of optical surface transferring surfaces, for example, the molten glass is not dropped onto a specific optical surface transferring surface but dropped onto a proper position other than the optical surface transferring surface. In this case, there is a possibility that an area is generated where the flow of glass does not come into contact with the optical surface transferring surface due to the relationship between the flow rate and viscosity of the glass. Therefore, transferring the optical surface transferring surface becomes incomplete and thus it is difficult to manufacture a molded glass product including the plurality of optical elements with a high accuracy.

CITATION LIST

Patent Literature

[PTL 1] Japanese Patent Application Publication No. 01-308840

SUMMARY OF INVENTION

The present invention is made in consideration of the above-described background art, and an object thereof is to provide a method of manufacturing an optical element or device which is capable of providing a satisfactory shape accuracy even in a case where a plurality of optical elements are molded.

Further, another object of the present invention is to provide an optical element which is molded by using the manufacturing method.

In order to attain the above-described objects, the present invention provides a method of manufacturing an optical element including a dropping step of dropping a molten glass drop (glass drop for an optical element) to one mold, which has a plurality of optical surface transferring surfaces corresponding to a plurality of optical elements, among a pair of molds and a molding step of press-molding by coupling the one mold with the other mold, wherein the one mold has a protruding portion, which changes the flow of the glass drop, at a portion corresponding to a mold surface other than the plurality of optical surface transferring surfaces. Herein, the portion corresponding to the mold surface, on which the protruding portion is provided, other than the plurality of optical surface transferring surfaces is a portion which is surrounded by the plurality of optical surface transferring surfaces and has been previously flattened.

According to the method of manufacturing an optical element, by providing the protruding portion to change the flow of the molten glass drop with the mold, it is possible to make the glass drop flow along the optical surface transferring surface, in the vicinity of the edge side close to the drop point of the glass drop, among the optical surface transferring surfaces. In other words, when the glass drop is dropped to the one mold and flows into the optical surface transferring surface, the flow thereof is adjusted by the protruding portion and the glass drop has a high tendency to flow along the optical surface transferring surface, which is close to the edge toward the protruding portion and has a large inclined angle, among the optical surface transferring surfaces. According to this, even in a case where a plurality of optical elements are collectively molded, it is possible to transfer the optical surface of the optical element to each optical surface transferring surface with a high accuracy and to collectively manufacture the plurality of optical elements with a satisfactory shape accuracy.

According to a specific embodiment or an aspect of the present invention, a flat mold surface may be formed between the plurality of optical surface transferring surfaces and the protruding portion. In this case, the glass drop, which the flow thereof is adjusted at the protruding portion, flows into the optical surface transferring surface through the flat mold surface.

According to another aspect of the present invention, the flat mold surface may be a connection surface transferring surface which connects the plurality of optical surface transferring surfaces. The connection surface transferring surface forms a portion which connects the plurality of optical elements in a molding product.

According to still another aspect of the present invention, the protruding portion may be provided at a drop position in which the glass drop is dropped in the dropping step. In this case, it is possible to effectively and relatively uniformly flow the dropped glass drop from the protruding portion of the drop position into the peripheral plurality of optical surface transferring surfaces.

According to further still another aspect of the present invention, the protruding portion may be provided in plural numbers. In this case, by providing the protruding portion in plural numbers, it is possible to intricately control the flow of glass.

According to further still another aspect of the present invention, the shape of the protruding portion may be any one of a dome shape, a ball shape, a cone shape, and a truncated cone shape. In this case, it is possible to make the shape of the protruding portion relatively simple. Moreover, the dome shape, the ball shape, the cone shape, and the truncated cone shape are a point symmetrical shape when being projected on a flat surface. In a case where the glass drop is dropped on the protruding portion, it is possible to make the dropped glass drop approximately uniformly flow from the protruding portion of the drop position into the plurality of optical surface transferring surfaces which are present in the vicinity of the protruding portion.

According to further still another aspect of the present invention, the protruding portion may be formed by pre-dropping a molten glass drop (glass drop for a protruding portion) before the dropping step. In this case, by forming the protruding portion by the glass drop in a similar way to the optical element, the surface of the glass protruding portion is melted by heat from the surrounding areas during the molding step or the entirety of the glass protruding portion is crushed, thereby being absorbed in an aggregation of the plurality of optical elements, that is, in a molded glass product. According to this, it is possible to reduce restrictions of the mold shape.

According to further still another aspect of the present invention, the protruding portion may be placed on a flat connection surface transferring surface which connects the plurality of optical surface transferring surfaces.

According to further still another aspect of the present invention, the weight of glass drop forming the protruding portion may be equal to or less than one-tenth of the weight of glass drop forming the plurality of optical elements. In this case, the weight of glass drop forming the protruding portion becomes small at least single digit or more than compared to the weight of glass drop forming the plurality of optical elements. Therefore, it is possible to reliably prevent the glass protruding portion from being impeditive in molding the optical element.

According to further still another aspect of the present invention, the glass drop forming the protruding portion and the glass drop forming the plurality of optical elements may be the same glass in composition. In this case, the glass drop forming the protruding portion is uniformly integrated with the glass drop forming the plurality of optical elements to be the aggregation of the plurality of optical elements, that is, the molded glass product. Therefore, it is possible to reduce the strain of optical elements.

According to further still another aspect of the present invention, the softening point of the glass drop forming the protruding portion may be lower than that of the glass drop forming the plurality of optical elements. In this case, during the molding step, it is possible to relatively rapidly soften the protruding portion and to prevent the glass protruding portion from being impeditive in molding the optical element particularly at the initial stage of pressing. According to this, it is possible to improve the surface accuracy of an optical surface of the optical element.

According to further still another aspect of the present invention, the glass drop forming the protruding portion may be formed through a dropping plate having an opening portion which has a smaller diameter than the glass drop forming the plurality of optical elements. In this case, in molding the protruding portion, in order to form the glass drop through the dropping plate, the same nozzle as a nozzle forming the glass drop for an optical element may be used. According to this, the glass drop, which is dropped from a single nozzle, may be separately produced or used for forming the optical element and for forming the protruding portion. Therefore, it is possible to reduce costs.

A glass element according to the present invention is molded by using the above-described method of manufacturing an optical element. According to this, it is possible to obtain an optical element with excellent transfer accuracy even in a case where a plurality of optical elements are molded.

BEST MODES FOR CARRYING OUT THE INVENTION

First Embodiment

A method of manufacturing an optical element according to a first embodiment of the present invention, or the like will be described with reference to FIG. 1 or the like.

Figure 1:
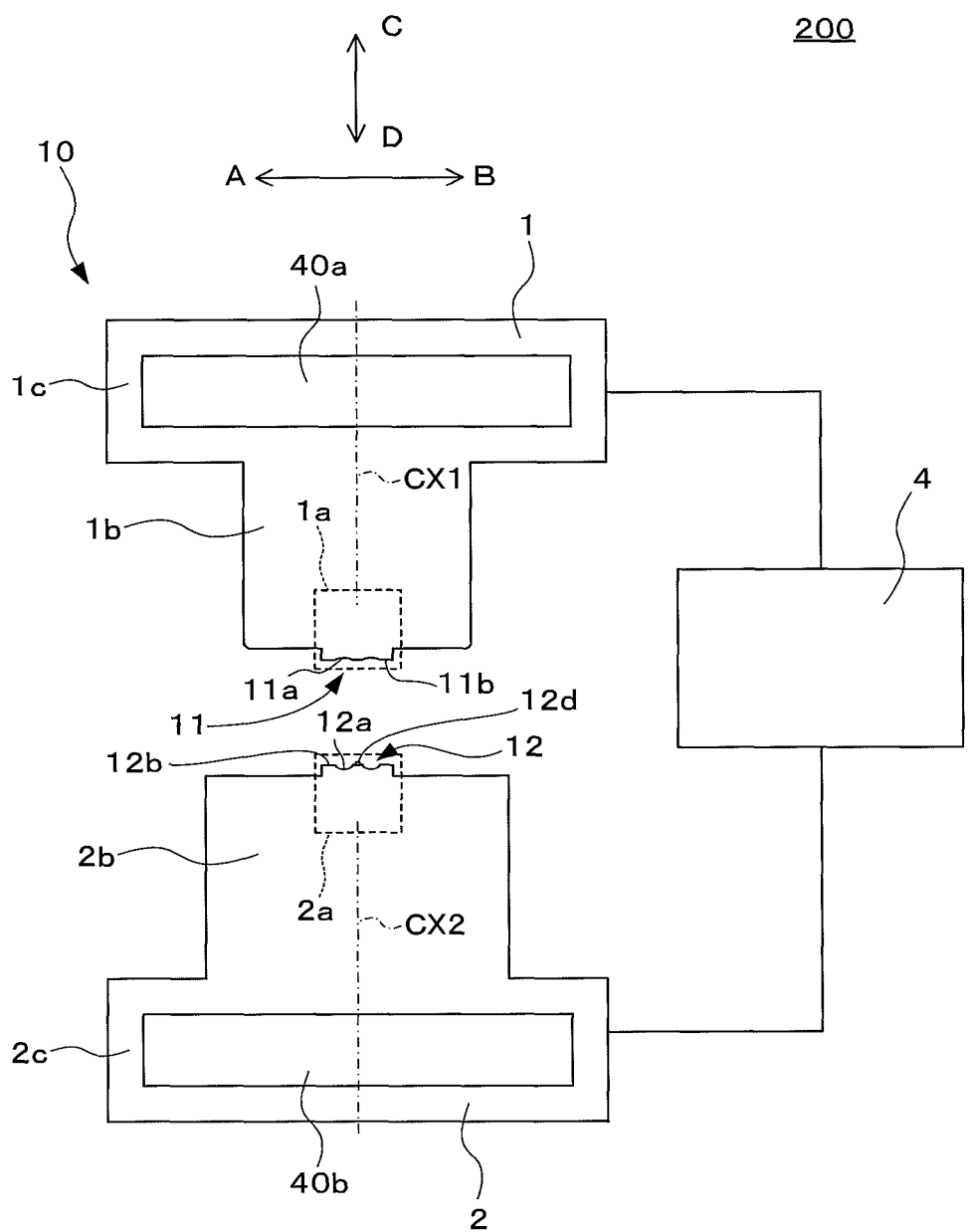
FIG. 1 is a diagram illustrating a molding apparatus used in a method of manufacturing a glass lens according to a first embodiment.
Figure 3A:
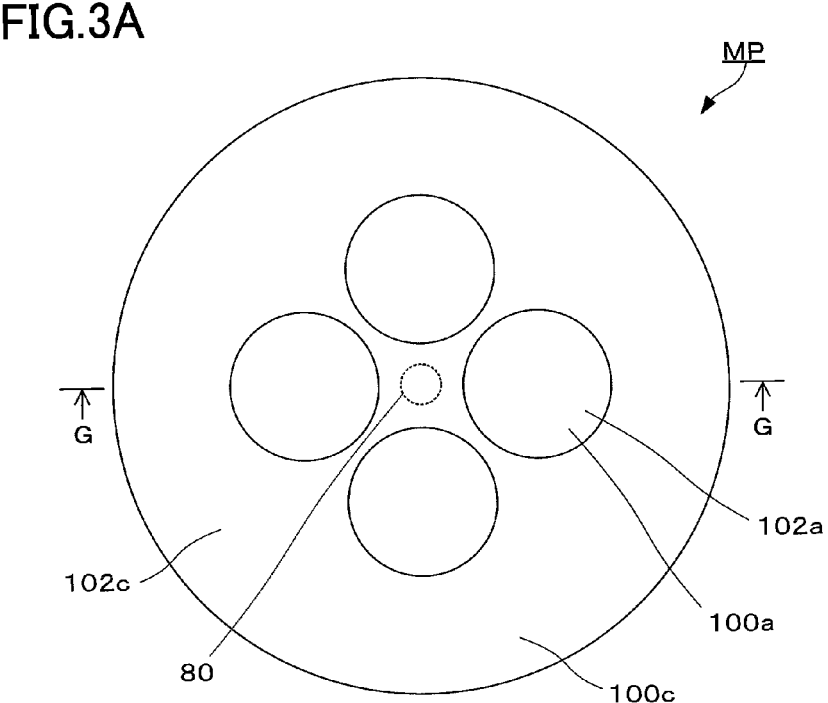
FIG. 3(A) is a plan view of a molded glass product molded by the forming mold.
Figure 3B:
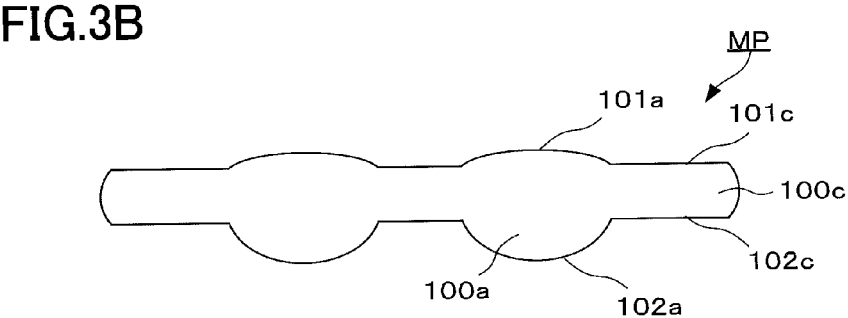
FIG. 3(B) is a cross-sectional view of FIG. 3(A) when seen from the GG arrow.
Figure 3C:
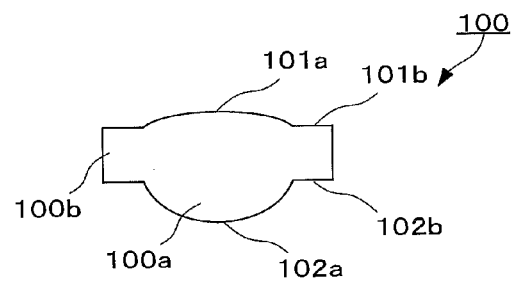
FIG. 3(C) is a cross-sectional view of the glass lens cut from the molded glass product of FIG. 3(A).

A molding apparatus 200 incorporating a molding device or forming mold 10 as shown in FIG. 1 is an apparatus for press-molding in which glass that is a raw material, is melted and directly pressed. The molding apparatus 200 can manufacture a molded glass product MP as shown in FIGS. 3(A) and 3(B) as an aggregation to be used for obtaining a glass lens 100, which is an optical element as shown in FIG. 3(C), or pre-processed goods. The molding apparatus 200 further includes a control drive device 4 to perform moving or driving the forming mold 10 at the time of manufacturing the glass lens 100, open and close operations or the like, a glass drop forming device 5 (refer to FIG. 4(A)) or the like, in addition to the forming mold 10 which is a main member.

As shown in FIG. 1, the molding device forming mold 10 includes an upper mold 1 at the movable side and a lower mold 2 at the fixed side. At the time of molding, for example, the lower mold 2 is maintained in a fixed state, the upper mold 1 is moved so as to face the lower mold 2, and thus mold closing is performed such that the both molds 1 and 2 are opposed to each other. Herein, as shown in FIGS. 3(A) to 3(C), the molded glass product MP molded by the molding apparatus 200 includes a plurality of glass lenses 100. Each glass lens 100, which is cut so as to divide the molded glass product MP that is a semi-integrated type product, is a part of an imaging lens used in an imaging apparatus or the like, for example. The glass lens 100 includes a center portion 100a having an optical function and a flange portion 100b extending from the center portion 100a to the outer diameter direction thereof. Optical function surfaces 101a and 102a, which function as an optical surface of the glass lens 100 have a different curvature to each other, and lens manufacturing is performed in such a manner that the optical function surface 102a side having a large curvature is disposed downward, in order to prevent imperfect molding, which is generated by trapped air at the time of press-molding, from occurring. That is, in this forming mold 10, the curvature of an optical surface transferring surface 12a of the lower mold 2 is large. On the other hand, an optical surface transferring surface 11a of the upper mold 1 has little curvature. In the molded glass product MP, the plurality of glass lenses 100 are integrally formed through a connection portion 100c. However, in the connection portion 100c, the glass lenses 100 and the circumference thereof are cut in a predetermined-size square shape using dicing or the like and thus the plurality of glass lenses 100 are divided into respectively independent glass lenses 100. In the respective glass lenses 100, the remained connection portion 100c after dividing corresponds to the plate-shaped flange portion 100b which supports the glass lens 100 from the circumference thereof and is used for attaching to the imaging lens or image pickup lens.

First, the lower mold 2 will be described with reference to FIG. 1 and FIGS. 2(A) and 2(B). The lower mold 2 includes a mold main body 2a, a supporting unit 2b, and a heater unit 2c.

Figure 2A:
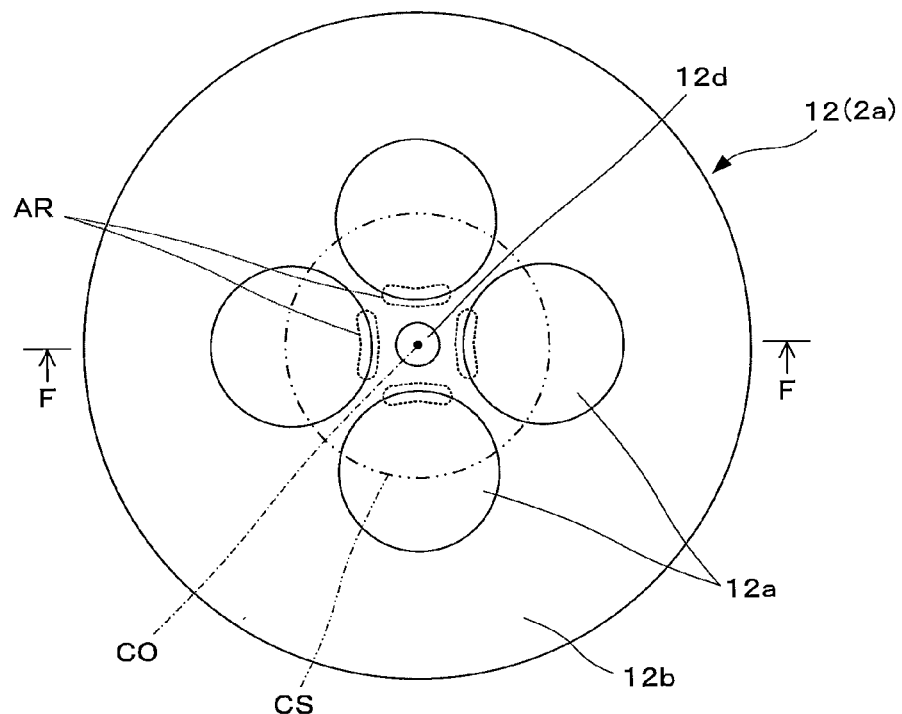
FIG. 2(A) is a plan view showing a main portion of a forming mold and FIG. 2(B) is a cross-sectional view of FIG. 2(A) when seen from the FF arrow.
Figure 2B:
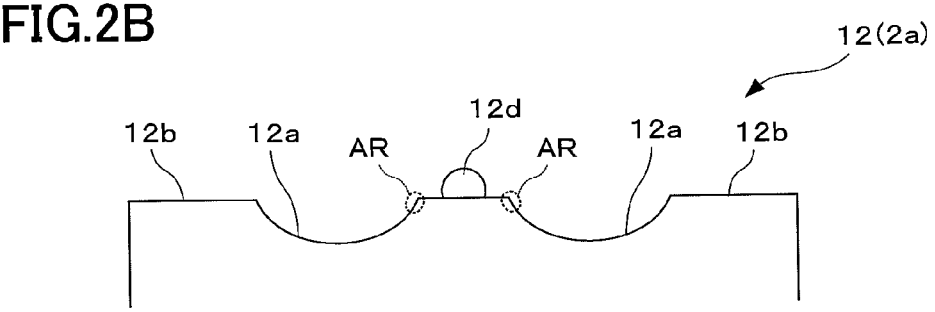

As shown in FIG. 1 and FIGS. 2(A) and 2(B), the mold main body 2a of the lower mold 2 is a cylindrical shape and includes a plurality of optical surface transferring surfaces 12a and a connection surface transferring surface 12b as a transferring surface at the time of molding on a mold surface 12. The former optical surface transferring surface 12a is to form the optical function surface 102a, which has a relatively large curvature, in the center portion 100a of the glass lens 100 and four optical surface transferring surface 12a are provided on a circumference CS, which a center portion CO of the mold surface 12 is set as a base point, at equal spaces. As a result, it is considered that the optical surface transferring surfaces 12a are disposed at four corners of a virtual square and this provides convenience for division using dicing or singularizing techniques described later. The latter connection surface transferring surface 12b is to form a connection surface 102c (a flange surface 102b of the flange portion 100b which is completed later) of the connection portion 100c, and extends from outer edges of respective optical surface transferring surfaces 12a to other optical surface transferring surfaces 12a or the periphery of the mold surface 12, as a mold surface in which the plurality of optical surface transferring surfaces 12a two-dimensionally arranged on the mold surface 12 are excluded.

Figure 4A:
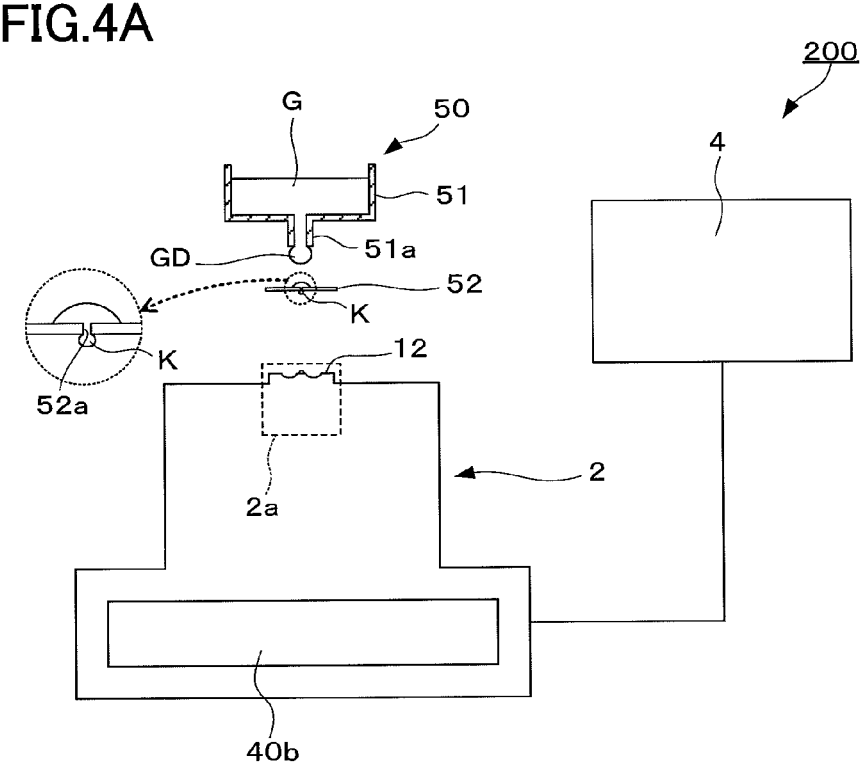
FIGS. 4(A) and 4(B) are another diagram illustrating the molding apparatus used in the method of manufacturing a glass lens according to the first embodiment.

As shown in FIGS. 2(A) and 2(B), at a position which is the center portion CO of the mold surface 12 and is equally distant from respective optical surface transferring surfaces 12a, one protruding portion 12d is provided in order to change the flow of a glass drop GD for an optical element (refer to FIG. 4(A)) which forms the glass lens 100. Herein, a mold surface in the vicinity of the center portion CO of the mold surface 12 is a flat surface surrounded by four optical surface transferring surfaces 12a. That is to say, the protruding portion 12d is disposed at the center of the flat surface (flat mold surface) surrounded by four optical surface transferring surfaces 12a. Although the details will be described later, the glass drop GD for an optical element to form the glass lens 100 is dropped at the position of the protruding portion 12d (refer to FIG. 4(B)). The protruding portion 12d is a dome shape and is formed by a glass drop K for a protruding portion (refer to FIG. 4(A)). Specifically, the protruding portion 12d is formed by pre-dropping in which the molten glass drop K for a protruding portion is dropped in a similar way to the dropping step of the glass drop GD for an optical element, before the dropping step described later. In a specific example, the ratio of the height of the protruding portion 12d to the distance from the outer edge of the protruding portion 12d to the outer edge of each optical surface transferring surface 12a is appropriately set depending on the size of the glass drop GD for an optical element, or the like. For example, the ratio thereof is 2:5.

Returning to FIG. 1, an electric heater 40b for moderately heating the mold main body 2a is embedded in the heater unit 2c provided on the base of the supporting unit 2b of the lower mold 2.

Next, the upper mold 1 will be described. As shown in FIG. 1, the upper mold 1 includes a mold main body 1a, a supporting unit 1b, and a heater unit 1c.

The mold main body 1a of the upper mold 1 is a cylindrical shape and includes a plurality of optical surface transferring surfaces 11a and a connection surface transferring surface 11b, as a transferring surface at the time of molding on the mold surface 11. The former optical surface transferring surface 11a is to form the optical function surface 101a having a relatively small curvature of the glass lens 100 and four optical surface transferring surfaces 11a are formed on the circumference, which the center portion of the mold surface 11 is set as a base point, at equal spaces so as to be face the optical surface transferring surfaces 12a of the lower mold 2. The latter connection surface transferring surface 11b is to form a connection surface 101c (a flange surface 101b of the flange portion 100b which is completed later) of the connection portion 100c, and evenly extends from outer edges of respective optical surface transferring surfaces 11a to other optical surface transferring surfaces 11a or the periphery of the mold surface 11, as a mold surface in which the plurality of optical surface transferring surfaces 11a two-dimensionally arranged on the mold surface 11 are excluded.

An electric heater 40a for moderately heating the mold main body 1a is embedded in the heater unit 1c provided on the base of the supporting unit 1b of the upper mold 1.

At the time of press-molding, the upper mold 1 and the lower mold 2 maintain an appropriate positional relationship therebetween in such a manner that the respective transferring surfaces 11a and 11b of the upper mold 1 and the respective transferring surfaces 12a and 12b corresponding to the lower mold 2 are concentrically disposed to be separated to each other only at a predetermined gap during pressing and cooling, or the like.

The control drive device 4 controls the power supply to the electric heaters 40a and 40b and the entirety of the molding apparatus 200 incorporating the forming mold 10 such as open and close operations of the upper mold 1 and lower mold 2, in order to mold the glass lens 100 by the forming mold 10. In addition, as shown in FIG. 1, the upper mold 1 driven by the control drive device 4 is movable in a horizontal AB direction and movable in a vertical CD direction. For example, when mold closing is performed by coupling the both molds 1 and 2 together, first, the upper mold 1 is moved to the upper position of the lower mold 2 so as to match an axis CX1 to an axis CX2 of the both molds 1 and 2. Furthermore, the upper optical surface transferring surface 11a and the lower optical surface transferring surface 12a respectively match each other and then the upper mold 1 is descended so as to be impressed to the lower mold 2 side at a predetermined force.

As shown in FIG. 4(A), the glass drop forming device 5 includes a raw material supply unit 51 and a dropping plate 52. The raw material supply unit 51 and the dropping plate 52 are heated by a heater which is not shown in the drawing. Then, glass in the raw material supply unit 51 turns into a molten state and the molten state of glass passing through the dropping plate 52 is maintained.

The raw material supply unit 51 accumulates molten glass G that is melted by a melting crucible or the like, which is not shown in the drawing, and the glass drop GD for an optical element obtained from the molten glass G, is dropped from a nozzle 51a at a predetermined timing, thereby supplying the glass drop GD for an optical element to the mold surface 12 of the lower mold or the dropping plate 52. The raw material supply unit 51 is used not only in forming the glass drop GD for an optical element which is directly used in molding the molded glass product MP but also in forming the glass drop K for a protruding portion in the pre-dropping step which is performed before molding the molded glass product MP.

The dropping plate 52 is to form the smaller glass drop K for a protruding portion from the glass drop GD for an optical element which is supplied from the raw material supply unit 51. This dropping plate 52 is disposed directly below the nozzle 51a, which is provided at the lower part of the raw material supply unit 51, and has an opening portion 52a which has a smaller diameter than the opening of the nozzle 51a of the raw material supply unit 51. According to this, the glass drop GD for an optical element, which is dropped to the dropping plate 52, passes through the opening portion 52a so as to be the glass drop K for a protruding portion having a smaller diameter than the glass drop GD for an optical element. Specifically, the diameter size of the opening portion 52a is set such that the weight of glass drop K for a protruding portion is equal to or less than one-tenth of the weight of glass drop GD for an optical element dropped from the nozzle 51a.

Hereinafter, referring to FIG. 4(A), the formation of the protruding portion 12d of the lower mold 2 of the forming mold 10 will be described in detail. As shown in FIG. 4(A), the glass drop K for a protruding portion to form the protruding portion 12d is formed by using the glass drop forming device 5 (pre-dropping step).

First, the nozzle 51a, which is formed on the lower part of the raw material supply unit 51 accumulating the molten glass G melted by a melting pot or the like (not shown), and the opening portion 52a of the dropping plate 52 are disposed above the center portion CO of the mold surface 12 of the lower mold 2 and the upper part of the connection surface transferring surface 12b separating from the optical surface transferring surface 12a at equal spaces. Then, the molten glass G is naturally dropped from the nozzle 51a onto the dropping plate 52. The glass drop GD for an optical element dropped on the dropping plate 52 passes through the opening portion 52a to be turned into the glass drop K for a protruding portion having a smaller diameter than the glass drop GD for an optical element (equal to or less than one-tenth of the weight of glass drop GD for an optical element) and then is naturally dropped onto the mold surface 12. That is, by using the dropping plate 52, it is possible to adjust the size of glass drop K for a protruding portion. While the shape of the dropped glass drop K for a protruding portion is maintained by surface tension, the dropped glass drop K for a protruding portion is cooled and cured on the mold surface 12 so as to be the protruding portion 12d having a dome shape. Moreover, as raw material of glass used for the molten glass G, glass having the same composition as the molded glass product MP (glass lens 100) is used and examples of the glass include phosphate-based glass.

Figure 4B:
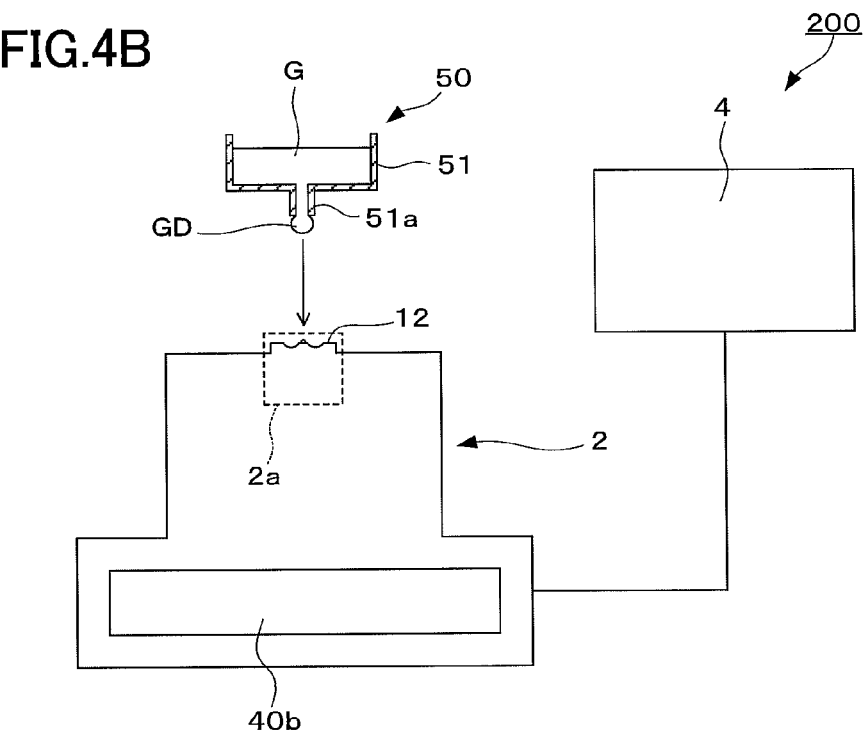

Hereinafter, with reference to FIG. 4(B) and FIGS. 5(A) and 5(B), a method of manufacturing the molded glass product MP, which includes the plurality of glass lenses 100, using the forming mold 10 shown in FIG. 2(A) or the like will be described.

First, the nozzle 51a, which is formed on the lower part of the raw material supply unit 51, is disposed above the center portion CO of the mold surface 12 of the lower mold 2 and the upper part of the protruding portion 12d formed by pre-dropping and the molten glass G is naturally dropped from the nozzle 51a onto the mold surface 12 (dropping step). At this time, before dropping the molten glass G, the mold surface 12 is heated by the electric heater 40b such that the temperature thereof is approximately the same as the glass transition temperature of the glass drop GD for an optical element that is a raw material of the glass lens 100. Further, after dropping the glass drop GD for an optical element, the nozzle 51a is retracted to a position so as not to cause an obstruction when moving the upper mold 1 up and down. When using a glass supply method by natural dropping from this nozzle 51a, it is possible to suppress the weight unevenness of the glass drop GD for an optical element to be dropped for the purpose of obtaining the glass lens 100. In addition, as raw materials of glass used for the molten glass G, as described before, the same glass used for the glass drop K for a protruding portion, for example phosphate-based glass or the like, may be used. Furthermore, the dropping plate 52 is retracted after pre-dropping and thereafter the dropping step may be continued.

Figure 6A:
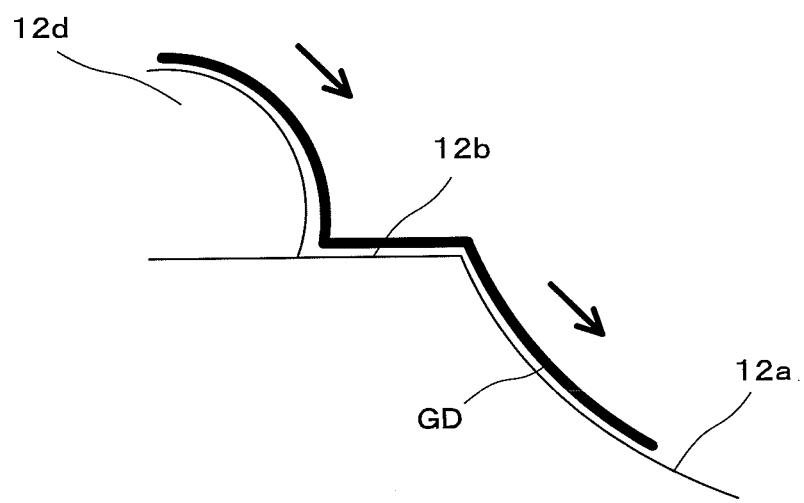
FIG. 6(A) is a conceptual diagram illustrating the flow of a glass drop after dropping step and FIG. 6(B) is a diagram illustrating a comparative example of FIG. 6(A).
Figure 6B:
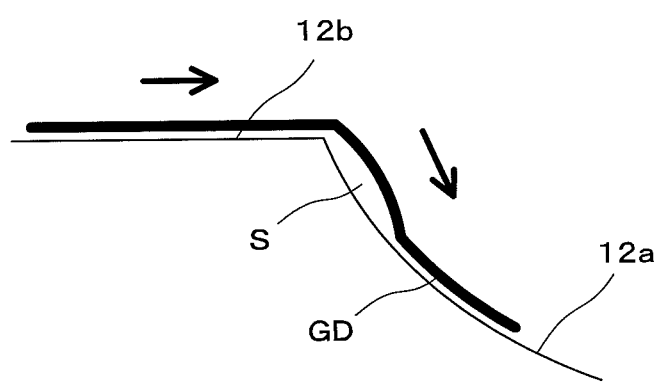

In the dropping step, as shown in FIG. 6(A), the glass drop GD for an optical element which is dropped to the mold surface 12 radially spreads from the peripheral connection surface transferring surface 12b of the protruding portion 12d to each optical surface transferring surface 12a, in the protruding portion 12d that is a drop position. At this time, the dropped glass drop GD for an optical element hits against the protruding portion 12d and thus the flow rate or direction is adjusted. Specifically, the glass drop GD for an optical element is controlled to the downward-sloping flow and the glass drop GD for an optical element is flowed along the optical surface transferring surface 12a in the vicinity of edge side (area AR of FIG. 2(A)) close to the drop point of the glass drop GD for an optical element, among the optical surface transferring surfaces 12a. Furthermore, if the protruding portion 12d is not provided, as a comparative example shown in FIG. 6(B), at the edge side of the optical surface transferring surface 12a, a portion where the glass drop GD for an optical element does not flow along the optical surface transferring surface 12a, is easily generated and a gap S is formed at this portion. Therefore, the optical surface transferring surface 12a is not preferably transferred.

Figure 5A:
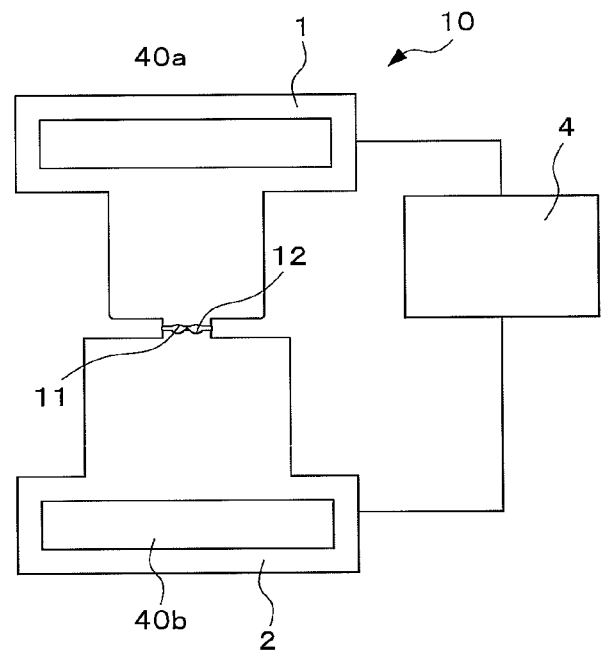
FIGS. 5(A) and 5(B) are cross-sectional views illustrating the step of manufacturing a glass lens using the molding apparatus.
Figure 5B:
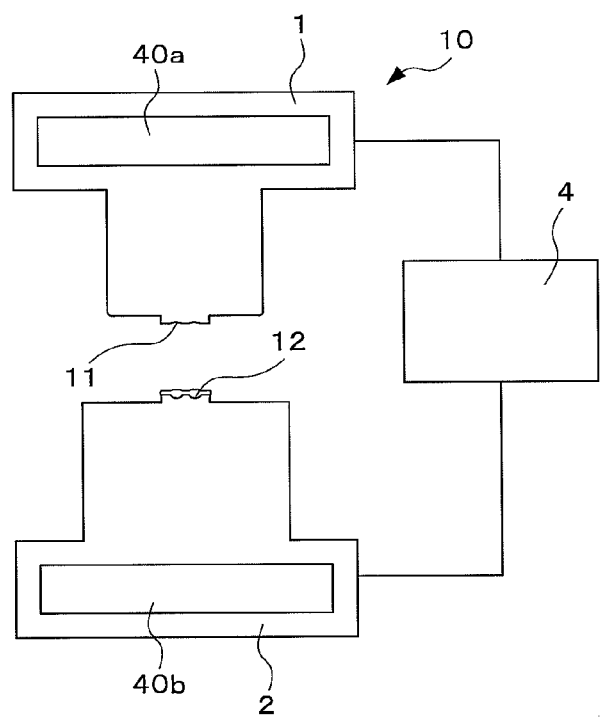

After a predetermined weight of the glass drop GD for an optical element is dropped from the nozzle 51a onto the mold surface 12, as shown in FIG. 5(A), the upper mold 1, which is heated in advance at the same temperature as the lower mold 2, is lowered while the temperature of the glass drop GD for an optical element is a temperature at which the glass drop GD for an optical element can be press-deformed yet. Then, the upper mold 1 come into close contact with the lower mold 2 in a state where the mold surface 11 and the mold surface 12 face each other and the glass drop GD for an optical element on the lower mold 2 is press-molded between the upper mold 1 and the lower mold 2 (molding step). At the time of the molding step, the protruding portion 12d provided on the mold surface 12 of the lower mold 2 is crushed by pressing or heating and is molded so as to be fused with the glass drop GD for an optical element.

The temperature of the glass drop GD for an optical element is gradually lowered from the dropping step to the molding step. According to this, the molded glass product MP, which includes the glass lens 100 having one optical function surface 101a of the glass lens 100 and the flange 101b, and the other optical functional surface 102a thereof and the flange 102b, is molded. As shown in FIG. 3(A), in the molded mglass product MP, the fused protruding portion 12d is undistinguishable from the glass drop GD for an optical element or a boundary 80 between the glass drop GD for an optical element and the glass drop K for a protruding portion may be slightly distinguished. After sufficiently cooling the molded glass product MP, the application of pressure to the lower mold 2 and the upper mold 1 is released and, as shown in FIG. 5(B), the upper mold 1 is elevated. Therefore, the molded glass product MP is taken out of the mold (taking out step).

After the taking out step, the connection portion 100c of the molded glass product MP is divided into 4 squares using a dicer or the like. Therefore, the glass lens 100 as shown in FIG. 3(C) is obtained (cutting step).

According to the method of manufacturing an optical element, by providing the protruding portion 12d to change the flow of the molten glass drop GD for an optical element with the forming mold 10, it is possible to make the glass drop GD for an optical element flow along the optical surface transferring surface 12a in the vicinity of edge side close to the drop point of the glass drop GD for an optical element, among the optical surface transferring surfaces 12a. In other words, when the glass drop GD for an optical element dropped to the lower mold 2 is flowed into the optical surface transferring surface 12a, the flow thereof has been adjusted by the protruding portion 12d and the glass drop GD for an optical element has a high tendency to flow along the optical surface transferring surface 12a, which has a large inclined angle and is close to the edge, among the optical surface transferring surfaces 12a. According to this, even in a case where the plurality of glass lenses 100 are collectively molded, it is possible to transfer the optical function surface 101a of the glass lens 100 to each optical surface transferring surface 12a with a high accuracy and to collectively manufacture the glass lenses 100 with a satisfactory shape accuracy.

Second Embodiment

Hereinafter, a method of manufacturing an optical element according to a second embodiment of the present invention, or the like will be described. The method of manufacturing an optical element of the second embodiment is to modify the method of manufacturing an optical element of the first embodiment, and a portion, which is not particularly described, is identical to the corresponding portion in the first embodiment.

Figure 7A:
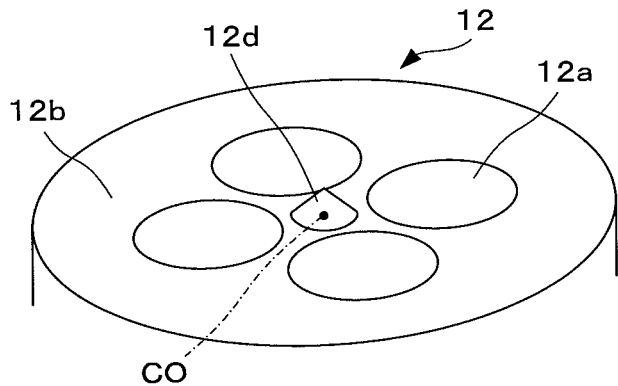
FIGS. 7(A) to 7(C) are perspective views of a mold according to a second embodiment.

As shown in FIG. 7(A), at a position which is the center portion CO of the mold surface 12 and is equally distant from respective optical surface transferring surfaces 12a, one protruding portion 12d is provided in order to change the flow of a glass drop forming the glass lens 100. In this embodiment, the protruding portion 12d is a cone shape and is formed on the mold surface 12 as a part of the forming mold 10, in advance. That is, the protruding portion 12d is not formed by pre-dropping the glass drop K for a protruding portion in a similar way to the first embodiment but is formed at the stage of die machining. The die machining of the protruding portion 12d is performed by cutting, for example. Moreover, the protruding portion 12d may be prepared as a discrete part in advance and attached to the mold surface 12.

Figure 7B:
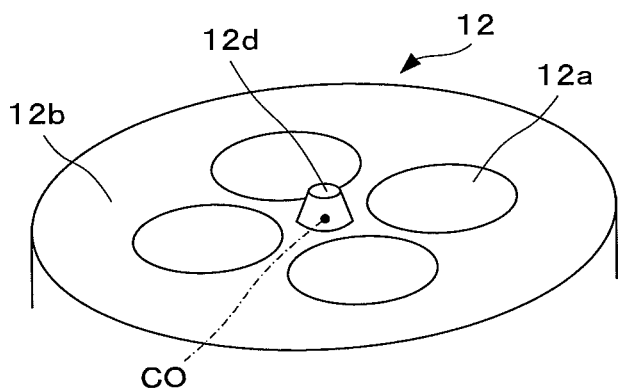
Figure 7C:
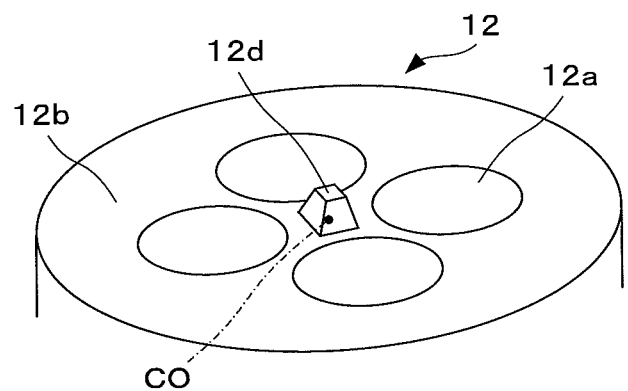

Furthermore, in this embodiment, the protruding portion 12d may be a truncated cone shape as shown in FIG. 7(B) or a trapezoidal shape as shown in FIG. 7(C).

Third Embodiment

Hereinafter, a method of manufacturing an optical element according to a third embodiment of the present invention, or the like will be described. The method of manufacturing an optical element of the third embodiment is to modify the method of manufacturing an optical element of the first embodiment and a portion, which is not particularly described, is identical to the corresponding portion in the first embodiment.

Figure 8A:
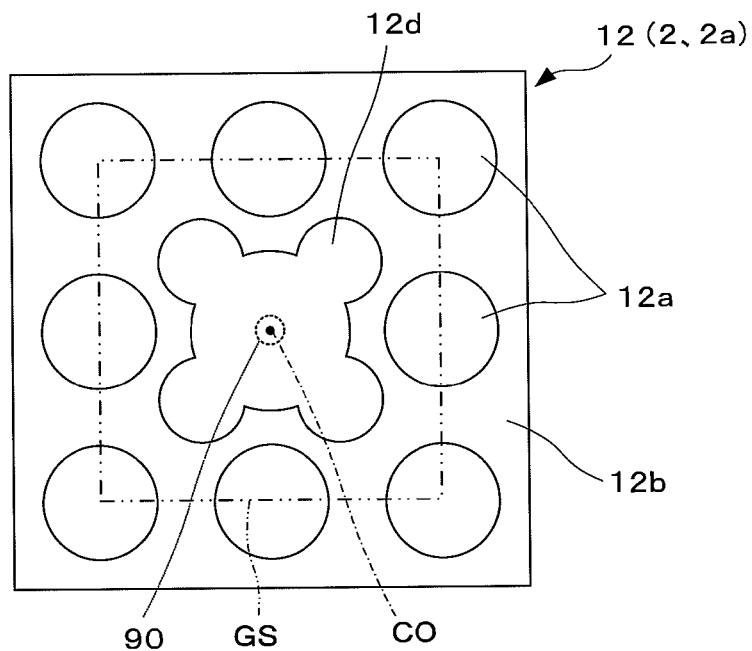
FIG. 8(A) is a plan view of a mold according to a third embodiment and FIG. 8(B) is a plan view of a mold according to a fourth embodiment.

As shown in FIG. 8(A), the rectangular mold surface 12 is formed at the upper end portion of the mold main body 2a of the lower mold 2 configuring the forming mold 10. In this embodiment, eight optical surface transferring surfaces 12a are formed on a circumference of square GS, which the center portion CO of the mold surface 12 is set as a base point, at equal spaces. That is, the optical surface transferring surfaces 12a are disposed on lattice points excluding the center. Similarly, also in the upper mold which is not shown in the drawing, eight optical surface transferring surfaces are formed on the rectangular mold surface to face the optical surface transferring surfaces 12a of the lower mold 2.

As shown in FIG. 8(A), at a position which is the center portion CO of the mold surface 12 and is equally distant from respective optical surface transferring surfaces 12a, one protruding portion 12d is provided. The glass drop GD for an optical element to form the glass lens 100 (refer to FIG. 4(B)) is dropped to a drop position 90 corresponding to the center of the protruding portion 12d. The protruding portion 12d is formed by collecting a plurality of dome-shaped protrusions and is configured to have one apex in the center portion CO and 4 apexes arranged at the vicinity thereof with equal spaces. A part of outer edge of the protruding portion 12d extends to the optical surface transferring surfaces 12a at four corners farthest from the center portion CO. In each optical surface transferring surface 12a, a distance difference between the outer edge of the protruding portion 12d and the optical surface transferring surface 12a becomes small. The protruding portion 12d is formed by dropping the glass drop K for a protruding portion 5 times or by simultaneously dropping 5 glass drops K for a protruding portion using a dropping plate which has 5 opening portions.

The glass drop GD for an optical element dropped to the mold surface 12 radially spreads from the drop position 90 to each optical surface transferring surface 12a. At this time, since a variation in the distance between the outer edge of the protruding portion 12d and each optical surface transferring surface 12a is small, the flow rate or direction of the glass drop GD for an optical element is adjusted. Therefore, the glass drop GD for an optical element is flowed along the optical surface transferring surface 12a.

Fourth Embodiment

Hereinafter, a method of manufacturing an optical element according to a fourth embodiment of the present invention, or the like will be described. The method of manufacturing an optical element of the fourth embodiment is to modify the method of manufacturing an optical element of the third embodiment and a portion, which is not particularly described, is identical to the corresponding portion in the third embodiment.

Figure 8B:
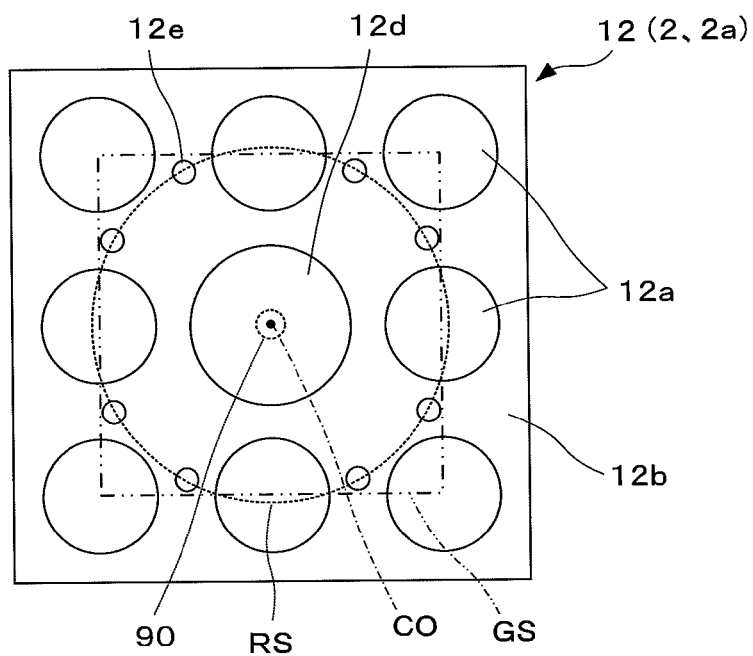

As shown in FIG. 8(B), one protruding portion 12d is provided at a position which is the center portion CO of the mold surface 12 and is equally distant from respective optical surface transferring surfaces 12a and 8 protruding portions 12e are provided on a circumference RS surrounding the protruding portion 12d. The 8 protruding portions 12e are disposed between respective optical surface transferring surfaces 12a one by one. The protruding portions 12d and 12e are a dome shape and formed by the glass drop K for a protruding portion (refer to FIG. 4(A)). The protruding portion 12d of the center portion CO has a larger diameter than the protruding portion 12e on the circumference RS and is formed by using different sized opening portions of the dropping plate. In a similar way to the third embodiment, the protruding portions 12d and 12e may be individually formed in series or simultaneously formed. In addition, the same convex shape may be formed by a mold.

The glass drop GD for an optical element dropped to the mold surface 12 radially spreads from the drop position 90 to each optical surface transferring surface 12a. At this time, since the protruding portion 12e provided on the circumference RS temporarily plays a role as a wall, the flow rate or direction of the glass drop GD for an optical element is adjusted. Therefore, the glass drop GD for an optical element is flowed along the optical surface transferring surface 12a.

Hereinbefore, the methods of manufacturing an optical element according to the embodiments or the like have been described but the method of manufacturing an optical element according to the present invention or the like is not limited to the above-described embodiments. For example, in the above-described embodiments, the shape and size of the protruding portions 12d and 12e are merely an example and any shapes and sizes thereof may be used as long as it change the flow of the glass drop GD for an optical element.

Further, in the above-described embodiments, as the glass drop K for a protruding portion to form the protruding portions 12d and 12e, glass having a lower softening point than the glass drop GD for an optical element may be used.

Furthermore, in the above-described embodiments, the number of optical surface transferring surfaces 12a or the like is not limited to 4 or 8 but may be 2 or more.

Furthermore, in the above-described embodiments, a concave portion to provide the glass drop K for a protruding portion on the mold surface 12 may be formed. According to this, it is possible to stabilize the position of the glass drop K for a protruding portion.

Furthermore, in the above-described embodiments, the glass lens 100 is cut in a square shape but this shape is merely an example. For example, the glass lens 100 may be cut in a circular shape. In addition, it is possible to freely set the arrangement of the optical surface transferring surfaces 11a and 12a depending on a cutting method of the glass lens 100.

Furthermore, in the first, third and fourth embodiments, the glass drop K for a protruding portion is formed by using the dropping plate 52 but may be formed by separately using a nozzle to drop a glass drop having a desired diameter size.

Furthermore, in the first, third and fourth embodiments, without performing the pre-dropping, the protruding portions 12d and 12e having a desired shape and size are formed of glass in advance and then attached onto the mold surface 12.

The invention claimed is:

1. A method of manufacturing an optical element, comprising:
    a dropping step of dropping a molten glass drop to one mold, which has a plurality of optical surface transferring surfaces corresponding to a plurality of optical elements, among a pair of molds; and
    a molding step of press-molding by coupling the one mold with the other mold,
    wherein the one mold has a protruding portion, which changes the flow of the glass drop, at a portion corresponding to a mold surface other than the plurality of optical surface transferring surfaces, and
    wherein the protruding portion is formed by pre-dropping a molten glass drop before the dropping step.

2. The method of manufacturing an optical element according to claim 1, wherein the protruding portion is placed on a flat connection surface transferring surface which connects the plurality of optical surface transferring surfaces.

3. The method of manufacturing an optical element according to claim 1, wherein the weight of glass drop forming the protruding portion is equal to or less than one-tenth of the weight of glass drop forming the plurality of optical elements.

4. The method of manufacturing an optical element according to claim 1, wherein the glass drop forming the protruding portion and the glass drop forming the plurality of optical elements are the same glass in composition.

5. The method of manufacturing an optical element according to claim 1, wherein the softening point of the glass drop forming the protruding portion is lower than that of the glass drop forming the plurality of optical elements.

6. The method of manufacturing an optical element according to claim 1, wherein the glass drop forming the protruding portion is formed through a dropping plate having an opening portion which has a smaller diameter than the glass drop forming the plurality of optical elements.

7. A method of manufacturing an optical element comprising:
    a dropping step of dropping a molten glass drop to one mold, which has a plurality of optical surface transferring surfaces corresponding to a plurality of optical elements, among a pair of molds; and
    a molding step of press-molding by coupling the one mold with the other mold,
    wherein the one mold has a protruding portion, which changes the flow of the glass drop, at a portion corresponding to a mold surface other than the plurality of optical surface transferring surfaces,
    wherein at least a portion of the protruding portion is provided at a drop position in which the glass drop is dropped in the dropping step, and
    wherein the protruding portion is formed by pre-dropping a molten glass drop before the dropping step.

8. The method of manufacturing an optical element according to claim 7, wherein a flat mold surface is formed between the plurality of optical surface transferring surfaces and the protruding portion.

9. The method of manufacturing an optical element according to claim 8, wherein the flat mold surface is a connection surface transferring surface which connects the plurality of optical surface transferring surfaces.

10. The method of manufacturing an optical element according to claim 7, wherein the protruding portion is provided in plural numbers, one of which is provided at the drop position of the glass drop in the dropping step.

11. The method of manufacturing an optical element according to claim 7, wherein the shape of the protruding portion is any one of a dome shape, a ball shape, a cone shape, and a truncated cone shape.

12. The method of manufacturing an optical element according to claim 7, wherein the protruding portion is placed on a flat connection surface transferring surface which connects the plurality of optical surface transferring surfaces.

13. The method of manufacturing an optical element according to claim 7, wherein the weight of glass drop forming the protruding portion is equal to or less than one-tenth of the weight of glass drop forming the plurality of optical elements.

14. The method of manufacturing an optical element according to claim 7, wherein the glass drop forming the protruding portion and the glass drop forming the plurality of optical elements are the same glass in composition.

15. The method of manufacturing an optical element according to claim 7, wherein the softening point of the glass drop forming the protruding portion is lower than that of the glass drop forming the plurality of optical elements.

16. The method of manufacturing an optical element according to claim 7, wherein the glass drop forming the protruding portion is formed through a dropping plate having an opening portion which has a smaller diameter than the glass drop forming the plurality of optical elements.

* * * * *